United States Patent
Bouveresse

(10) Patent No.: US 9,245,162 B2
(45) Date of Patent: Jan. 26, 2016

(54) DEVICE FOR READING/WRITING RFID TAGS AND COLLECTION TERMINAL COMPRISING SUCH A DEVICE

(71) Applicant: I E R, Suresnes (FR)

(72) Inventor: Jean-Clement Bouveresse, Sannois (FR)

(73) Assignee: IER, Suresnes (FR)

( * ) Notice: Subject to any disclaimer, the term of this patent is extended or adjusted under 35 U.S.C. 154(b) by 0 days.

(21) Appl. No.: 14/098,049

(22) Filed: Dec. 5, 2013

(65) Prior Publication Data

US 2014/0158772 A1 Jun. 12, 2014

(30) Foreign Application Priority Data

Dec. 7, 2012 (FR) ...................................... 12 61811

(51) Int. Cl.
| | | |
|---|---|---|
| G06K 19/00 | (2006.01) | |
| G06K 7/10 | (2006.01) | |
| G07G 1/00 | (2006.01) | |
| A47F 9/04 | (2006.01) | |
| G06K 17/00 | (2006.01) | |

(52) U.S. Cl.
CPC ........ *G06K 7/10415* (2013.01); *G06K 7/10178* (2013.01); *G07G 1/0045* (2013.01); *A47F 9/047* (2013.01); *G06K 2017/0067* (2013.01)

(58) Field of Classification Search
USPC .............................. 235/487, 492; 340/10, 572
See application file for complete search history.

(56) References Cited

U.S. PATENT DOCUMENTS

| | | | | |
|---|---|---|---|---|
| 6,169,483 | B1 * | 1/2001 | Ghaffari et al. ............ | 340/572.3 |
| 2008/0094178 | A1 | 4/2008 | Angerer | |
| 2009/0015381 | A1 * | 1/2009 | Mochida et al. ............. | 340/10.2 |
| 2009/0256680 | A1 * | 10/2009 | Kilian .......................... | 340/10.1 |
| 2013/0241700 | A1 | 9/2013 | Gentelet et al. | |

FOREIGN PATENT DOCUMENTS

| | | |
|---|---|---|
| CN | 202413873 | 9/2012 |
| EP | 1717772 | 11/2006 |
| GB | 2409089 | 6/2005 |

OTHER PUBLICATIONS

IER brochure, "Fabricant de temps", Sep. 30, 2012.

* cited by examiner

*Primary Examiner* — Matthew Mikels
(74) *Attorney, Agent, or Firm* — Greer, Burns & Crain, Ltd.

(57) ABSTRACT

A device is provided for reading/writing at least one RFID tag carried by at least one object, including:
- at least one depositing cavity, for receiving the at least one object, said depositing cavity including:
  - at least one bottom wall and at least one side wall;
  - at least one RFID reading/writing means; and
  - at least one insertion aperture, for depositing objects in the depositing cavity, formed substantially in a top part of the depositing cavity;
- at least one protective wall, arranged around the insertion aperture, extending upwards from the insertion aperture and attenuating waves between the depositing cavity and the outside; and
- at least one access opening, for accessing the insertion aperture through the at least one protective wall. A collection terminal using such device is also provided.

14 Claims, 2 Drawing Sheets

_US 9,245,162 B2_

DEVICE FOR READING/WRITING RFID TAGS AND COLLECTION TERMINAL COMPRISING SUCH A DEVICE

BACKGROUND

The present invention relates to a device for reading/writing RFID tags, and in particular RFID tags each carried by objects in order to identify said objects. It also relates to a collection terminal utilizing such a device.

The field of the invention is the field of the reading/writing of RFID tags, in particular of RFID tags each identifying an object on which it is affixed for the automated collection of an amount during an operation of the sale/purchase of said object in a retail outlet such as a supermarket.

For some years it has been sought to install self-service collection devices in hypermarkets. Collection terminals are already known, comprising means for the optical reading of a barcode and scales making it possible to measure the weight of the object carrying the tag read, for example, in order to carry out checks to confirm that the tag read is indeed associated with the object handled. The user of this type of terminal passes each object in front of the optical barcode reader then places it on the scales.

This type of device functions satisfactorily but requires a relatively long read time since the objects carrying the tags are dealt with one at a time.

RFID reading devices are also known, for example that described in the patent application published under number FR 2 966 954 A1, making it possible to carry out a more rapid reading, or even the simultaneous reading of several RFID tags each affixed to an object. Such reading devices allow a simultaneous collection for several objects when they are used in the context of a collection terminal.

The inventors have noted that these RFID reading devices do not make it possible to carry out an efficient reading of RFID tags affixed to certain types of objects, in particular when the object carrying the tag comprises a liquid, such as for example a liquid container, or has a high liquid content, such as for example certain fruits or vegetables.

SUMMARY

The purpose of the invention is to remedy the abovementioned drawbacks.

Another purpose of the invention is to propose a device for reading RFID tags making it possible to carry out a rapid reading of the tags that is more efficient than the known RFID reading devices, irrespective of the type of objects carrying the tags.

The invention makes it possible to achieve at least one of the abovementioned purposes by means of a device for reading/writing at least one RFID tag carried by at least one object, comprising:
  at least one cavity, called depositing cavity, for receiving said at least one object, said depositing cavity comprising:
    at least one bottom wall and at least one side wall,
    at least one RFID reading/writing means, and
    at least one aperture, called insertion aperture, for depositing objects in said cavity and formed substantially in a top part of said depositing cavity,
  at least one wall, called protective wall, arranged around said insertion aperture, extending upwards from said insertion aperture and capable of attenuating waves between said depositing cavity and the outside, and
  at least one opening, called access opening, for accessing said insertion aperture through said at least one protective wall.

The reading/writing device according to the invention therefore makes it possible to carry out a reading/writing of one or more RFID tags each carried by objects deposited in a depositing cavity the entrance of which is surrounded by one or more protective walls attenuating waves between said depositing cavity and the outside of said depositing cavity. In other words, the protective wall(s) form a screen for protection principally against the tag activation waves originating from the depositing cavity and directed towards the outside and optionally, in the case where these activation waves have succeeded in leaving the cavity, against the waves emitted in response originating from the outside and directed towards the depositing cavity.

The opening makes this screen less efficient but is necessary to guarantee the user access to the space for depositing the objects. Furthermore, the fact that the user stands in front of the opening allows relatively efficient replacement of the screen at the level of the opening, and prevents the emission of waves to the outside of the cavity via the opening.

In order to prevent this emission of waves to the outside of the cavity even more efficiently, the device can comprise a panel which is mobile (in rotation or translation) between a closed position in which it covers the opening and an open position in which it leaves access to the opening free.

The device according to the invention thus makes it possible to limit, in the depositing cavity, the disturbances due to the waves transmitted by sources located outside the depositing cavity which can interfere with the reading of the RFID tags. Therefore, the device according to the invention makes it possible to increase, in the depositing cavity, the power of the waves used to carry out a reading/writing operation, without the risk of energizing and therefore reading the RFID tags affixed to products situated in the vicinity of the terminal, in particular on racks adjacent to the terminal and therefore to better read the tags situated in the cavity, even those affixed to objects comprising a liquid.

Thus, all these characteristics allow the device according to the invention to carry out a rapid reading/writing of RFID tags more efficiently than the known RFID reading devices.

Advantageously, the protective wall(s) can be arranged so that:
  in a first plane, which is in particular the plane formed by the insertion aperture and even more particularly a substantially horizontal plane, they surround the insertion aperture on all its sides except the side, or a part of the side, facing the access opening to the insertion aperture, and
  in a second plane, which is in particular the plane formed by the access opening to the insertion aperture and even more particularly a substantially vertical plane, they surround the access opening on all its sides. Also, it would be possible for the access opening not to be bordered by the protective wall on one of its sides, in particular at its top, Advantageously, the RFID reading/writing means are arranged in order to emit waves in said cavity and/or receive waves from RFID tags present in said cavity in order to read said RFID tags and/or write to said RFID tags.

The at least one RFID reading/writing means can comprise in particular at least one RFID antenna and at least one RFID reader cooperating with said RFID antenna, and preferably a plurality of RFID antennas distributed over the different side walls delimiting the depositing cavity.

The depositing cavity can be parallelepipedic.

The access opening and/or the insertion aperture can be rectangular.

Advantageously, the access opening can form, or can be situated in, a plane substantially perpendicular to the plane of the insertion aperture.

Such an arrangement of the access opening with respect to the insertion aperture makes it possible to reduce the interferences of the waves, entering the depositing cavity or leaving the depositing cavity.

The access opening can be made in a protective wall in front of the reading/writing device.

Advantageously, in the configuration of use, the insertion aperture can form, or can be situated in, a substantially horizontal plane, or a plane slightly inclined towards the user with respect to the horizontal plane, and the access opening can form, or can be situated in, a substantially vertical plane, or a plane slightly inclined towards the user with respect to the vertical plane.

Such a relative arrangement of the access opening and of the insertion aperture makes it possible to retain the advantage of reducing the interferences described above while facilitating the depositing of the objects in the depositing cavity. In fact in this case, it is sufficient to move a bag containing the objects forward through the access opening until it is situated above the insertion aperture, which corresponds substantially to a translation movement in a substantially horizontal plane, then to place them in the cavity, which corresponds substantially to a translation movement in a substantially vertical plane.

The depositing cavity can be surrounded by a wall, called outer wall, encompassing said side wall(s) of said depositing cavity, and comprising no sharp edges.

In other words, when the protective cavity comprises edges or ridges, in particular where two side walls meet, then the outer wall is rounded at the level of each of these edges/ridges. In fact, the inventors have found that a sharp edge at the level of the outer wall tended to act as an antenna and to radiate the waves, which runs counter to the sought objective of confining the waves in the depositing cavity.

The device according to the invention can moreover comprise a foam absorbing the waves and arranged between the side walls of the depositing cavity and the outer wall.

All these characteristics make it possible to reduce even further the propagation of the waves generated in the depositing cavity towards the outside of the depositing cavity. It is thus possible to increase the power of the waves used in the depositing cavity and to increase the reading/writing efficiency.

The insertion aperture can be advantageously arranged at the top of the depositing cavity.

The device can moreover comprise a top wall, for example substantially horizontal, connecting the side walls and the outer wall in which the insertion aperture is arranged. The top wall can optionally extend between the side walls.

Alternatively, the insertion aperture can be produced omitting the top wall.

Advantageously, at least one, in particular each, side wall of said depositing cavity can be metal, which makes it possible to achieve a significant reflection of the transmitted waves used in the depositing cavity in order to make it possible to supply energy to the RFID tags situated in this recess in different directions and as a result to increase the reading rate. This is particularly useful for reading the tags affixed to objects containing liquid.

The device according to the invention can, according to an embodiment, comprise several abutting protective side walls extending upwards from said insertion aperture, the access opening being arranged in one of said side walls.

The device according to the invention can moreover comprise a protective wall, called top wall, meeting all of the protective side walls in abutment. Alternatively, the side walls can be inclined towards one another so as to meet at a given height.

According to another embodiment, the device according to the invention can comprise a single protective wall, in particular made in a single piece. This side wall can then have a predetermined radius of curvature, as a function of the shape and dimensions of the aperture. In this case, the access opening is arranged in said single protective wall.

At least one, in particular each, protective wall can comprise, at least in part, an absorbent foam chosen in order to attenuate the waves passing through said wall(s).

Advantageously, at least one, preferentially each protective wall can be made of a plastic material, such as polyethylene or polypropylene, on its inner face so as not to deflect the trajectory of the waves in the event that an optional absorbent foam is situated in the protective metal wall on its outer face so as to have maximum insulation.

In particular, the protective wall can comprise an inner panel made of plastic material and an outer metal panel, an absorbent foam being interposed between these two panels.

The inner plastic panel can have a thickness comprised between 1 and 25 mm.

The inner panel can be made of PVC and free of heavy metals such as lead, cadmium or barium. The inner panel can be made of PVC with a density of 0.6 g/cm$^3$, hardness of 45D, and water absorption of <1.0%.

The inner panel can be made of PVC having surface resistivity of $>1.10^{14}$ Ω, volume resistivity of $>1.10^{15}$ Ω.cm and with a dielectric constant of 1.56 to 1 MHz.

The inner panel can be made of non-flammable PVC of class M1.

At least one, preferentially each, protective wall has a height greater than or equal to 0.50 m, from the insertion aperture, namely surmounts the insertion aperture to a height greater than or equal to 0.5 m. The wall can of course also extend into the bottom part of the device, below the insertion aperture.

The device according to the invention can moreover comprise at least one weighing means arranged in the base of said depositing cavity for measuring the weight of the objects deposited in said depositing cavity.

More particularly, the weighing means can comprise scales the plate of which can form the bottom wall of the depositing cavity.

Advantageously, the power of the waves transmitted by the at least one reading/writing means can be modified as a function of the weight measured by the weighing means. Thus, for example, when the weight of the objects deposited in the depositing cavity is significant, the power of the waves transmitted by the at least one reading/writing means can be significant. Conversely, when the weight of the objects deposited in the depositing cavity is low the power of the waves transmitted by the at least one reading/writing means can also be low. The power of the waves transmitted as a function of the weight can be modified either continuously or in predefined levels.

The device can also comprise means for detecting the presence of an object in the depositing cavity.

Such detection means can for example use a signal supplied by the weighing means or by another means, such as a camera or at least one infrared cell arranged in the depositing cavity.

The device according to the invention can moreover comprise at least one device for interaction with a user. This interaction device can be visual and/or acoustic.

Advantageously, the interaction device can be situated at a distance from the insertion aperture. Thus, the user has a large enough space by means of which he can very easily introduce the objects into the insertion aperture of the reading device.

Such an interaction device also allows the user to manage his interactions with the reading device better.

Such an interaction device can comprise a display screen arranged on/in a protective wall, for displaying images or videos, and/or one or more loudspeakers arranged on/in a protective wall in order to broadcast an acoustic signal.

Such an interaction device can optionally also comprise a camera and/or a microphone.

When the interaction device is a screen, it is preferably situated in the upper part of the device.

The device according to the invention can moreover comprise a light signalling means, for example arranged on at least one protective wall, in particular at the top of said protective wall, for example in order to signal a state of operation of said device.

According to a preferred embodiment, the protective wall (s) form the main body of the reading/writing device. The depositing cavity is made in a reading/writing module which can be detached, and more particularly removed, from said reading/writing device, for example via an element arranged in a protective wall in the bottom part of said device.

For example the reading cavity can be presented in the form of a drawer or a rack which can be slid in guide rails arranged on the inner surface of the protective wall(s) in the bottom part of the reading/writing device.

According to another aspect of the invention a collection terminal is proposed comprising:
- a reading/writing device according to the invention, and
- at least one payment device.

Advantageously, the collection terminal is presented in the form of a one-piece assembly, i.e. the reading/writing device and the payment device are in a single piece.

Advantageously, the collection terminal according to the invention can comprise two distinct payment devices:
- a first payment device, such as a bank card reader, reading payment data from a payment means by contact with this payment means, for example by inserting or sliding a bank card into the bank card reader, and
- a second payment device, such as an NFC (Near Field Communication) reader, reading payment data from a payment means without contact with this payment means.

The collection terminal according to the invention can also comprise at least one device for printing a report, for example a sales slip and/or a bank receipt.

Advantageously, the payment device can be arranged on/in a module contiguous with the reading/writing device, in particular in contact with at least one protective wall of said reading/writing device. The printing device can also be arranged in such a module.

In this case, the reading/writing device preferably makes up a main body of the collection terminal with which the contiguous module is assembled.

The different elements of the collection terminal according to the invention can be linked to a central unit capable of controlling each of the described devices or modules using a computer program.

Such a central unit can be a standard computer comprising in particular a microprocessor and a memory.

The computer program can be executed by means of the microprocessor and stored in the memory of the central unit.

The central unit can also be in communication, for example via a local or Internet-type network, with one or more external, local or remote servers, storing for example a database relating to the objects carrying the RFID tags.

According to another aspect of the invention an assembly is proposed, comprising two collection terminals according to the invention, the payment means of each collection terminal being arranged on a module, called central module, common to said collection terminals, in contact with a protective wall of the reading/writing device of each collection terminal.

Such an assembly is preferentially made in one piece, i.e. without a space between the collection terminals and the central module common to said collection terminals.

The central module common to the two collection terminals can be arranged between the collection terminals.

According to another embodiment, the assembly according to the invention can comprise a plurality of collection terminals, distributed around a single central module common to all the collection terminals and comprising the payment devices of each of said collection terminals.

In this case, the collection terminals can be arranged so that the front wall of each terminal, comprising the access opening, is facing a rear wall of another collection terminal of said assembly.

Advantageously the collection terminals of the assembly according to the invention can be arranged so that the access opening and the payment means of one of said terminals are arranged on a first side of said assembly, and the access opening and the payment means of the other of said terminals are arranged on a second side of said assembly, opposite said first side.

Thus, two individuals each in front of one of said terminals face one another. Such an arrangement makes it possible to reduce mutual interferences between the collection terminals.

BRIEF DESCRIPTION OF THE DRAWINGS

Other advantages and characteristics will become apparent on examination of the detailed description of embodiments which are in no way limitative, and the attached diagrams, in which.

DETAILED DESCRIPTION

It is well understood that the embodiments which are described below are in no way limitative. It is possible in particular to imagine variants of the invention comprising only a selection of characteristics described below isolated from the other characteristics described, if this selection of characteristics is sufficient to confer a technical advantage or to differentiate the invention with respect to the state of the prior art. This selection comprises at least one preferably functional characteristic without structural details, or with only a part of the structural details if this part only is sufficient to confer a technical advantage or to differentiate the invention with respect to the state of the prior art.

In particular all the variants and all the embodiments described can be combined with each other if there is no objection to this combination from a technical point of view.

In the figures, the elements common to several figures keep the same reference number.

Figure 1:
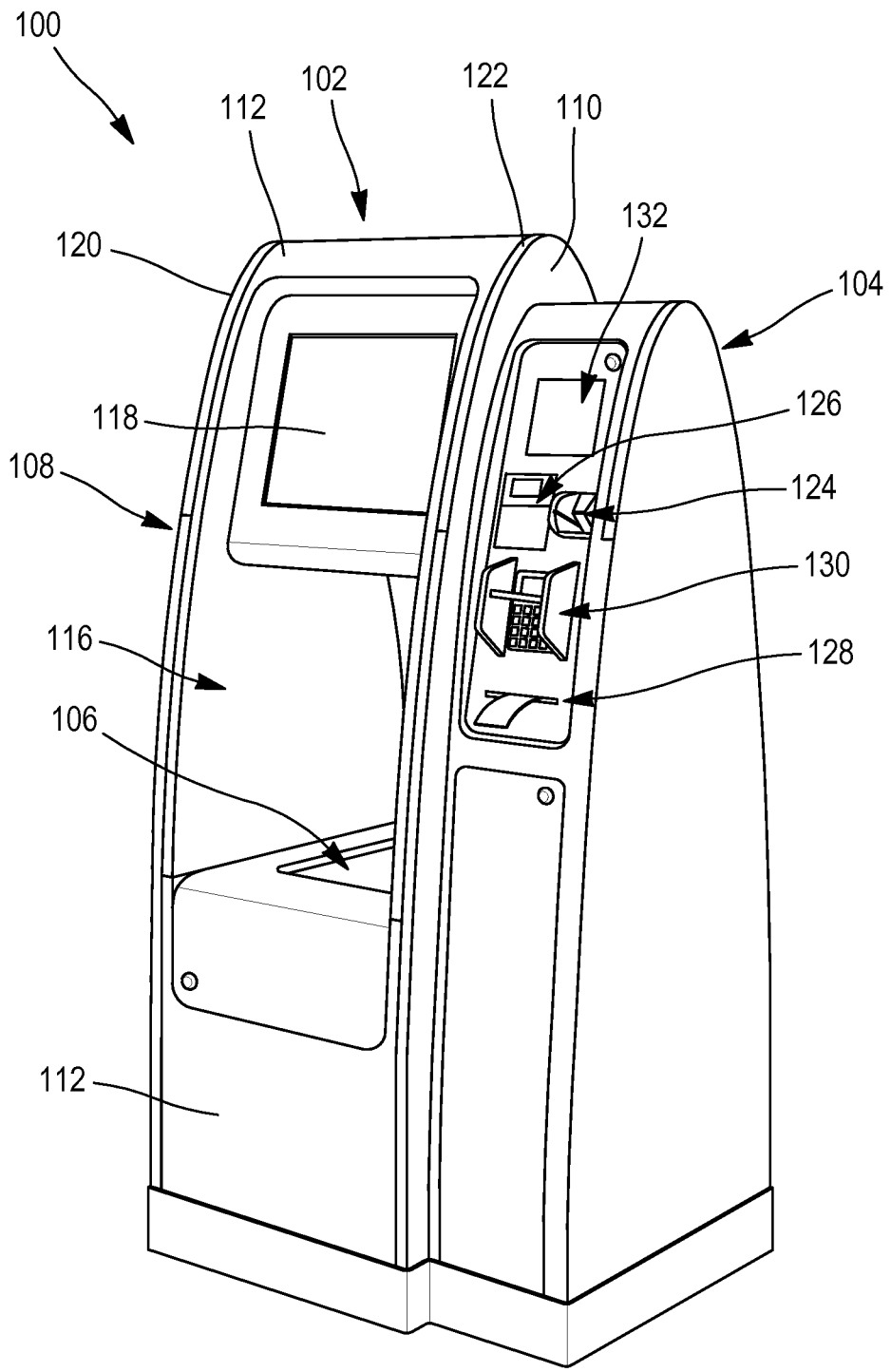
FIG. 1 is a diagrammatic representation of a non-limitative example of a collection terminal according to the invention.

FIG. 1 is a diagrammatic representation of an example self-service collection terminal according to the invention.

The collection terminal 100 in FIG. 1 comprises a reading/writing device RFID 102 and a side module 104, contiguous with the reading/writing device 102.

The device 102 comprises in the bottom part a rectangular depositing cavity (not visible in FIG. 1) comprising an aperture 106 for inserting objects into said depositing cavity, in a substantially horizontal plane. This depositing cavity will be described in greater detail with reference to FIG. 2.

The depositing cavity, and more particularly the insertion aperture 106, is surrounded by three solid protective walls, i.e. comprising no apertures. These walls are two protective side walls 108 and 110 and a protective wall 112 extending over the front face and the rear face of the reading device. The protective walls 108-112 are arranged around the insertion aperture 106 of the depositing cavity.

The device also comprises an opening 114 for access to the insertion aperture 106, arranged in the protective wall 112 at the level of the front face of the reading device 102. The access opening 116 is arranged so that it is situated substantially at a height greater than or equal to the height of the insertion aperture 106 and forms a substantially vertical plane, i.e. perpendicular to the horizontal plane formed by the insertion aperture 106.

The three protective walls 108-112 follow/surround the insertion aperture 106 in the horizontal plane, on all its sides, except the one that faces the access opening 116 thereto, i.e. follow the aperture on three sides thereof.

The different protective walls 108-112 comprise a foam absorbing the waves which are at the frequency used for reading the RFID tags in the depositing cavity, in order to prevent the objects situated outside the collection terminal 100 being detected. More particularly, the protective walls comprise an inner panel made of plastic material, an outer panel made of metal (for reflecting the waves) and an absorbent foam interposed between the two panels (for the absorption thereof).

The device 102 comprises in the upper part of the collection terminal 100, in the space delimited by the vertical side walls of the collection terminal, a means for interaction with the user which comprises a screen 118, and optionally a loudspeaker, a microphone or also a camera (not shown).

In the vertical direction of the collection terminal 100, the reading/writing device 102, comprises, in its top part, an empty volume between the protective walls 108-112, between the insertion aperture 106 and the top of the reading/writing device, which allows the user easy access to the insertion aperture 106.

Each protective side wall 108 and 110 comprises at its top a light-signalling device, 120 and 122 respectively. This device can in particular indicate the availability of the collection terminal 100 or the success or failure of an operation carried out on the collection terminal 100.

In the embodiment represented in FIG. 1, the protective walls of the collection terminal are at a height of approximately 0.6 metres above the insertion aperture.

The reading/writing device 102 also comprises a screen (not visible in FIG. 1) situated on the bottom wall and directed in the opposite direction to that of the screen 118. This screen, unlike the screen 118 is not a screen intended to interact with the user initiating the collection. It can for example serve to explain the operation of the payment terminal or to display advertisements relating to the store, or to the services or products marketed therein.

The collection terminal also comprises a side module 104 in contact with and connected to the reading/writing device 102. The side module comprises on its front face:
- a first payment device, such as a bank card reader 124, requiring contact with a payment means such as a bank card, by inserting/swiping the payment means in a slot in the payment device provided for this purpose,
- a second payment device, such as an NFC reader 126, not requiring contact with the payment means or insertion of a payment means into a slot, and
- a printing device 128 for printing a sales slip or bank receipt.

The side module 104 also comprises a keyboard 130 and a screen 132 for interacting with the user.

The side module 104 is arranged outside the space delimited by the side walls 108-112 of the collection terminal. More particularly, a side wall of the side module 104 is in contact with the side wall 110 of the reading/writing device 102.

The reading/writing device 102 has a general shape such that its width remains constant over its entire height whereas its depth is reduced progressively from its bottom part to its top part. In the top part, the reading/writing device 102 terminates in a rounded end formed by the protective wall 112. Over its entire height, the protective walls 108-112 are in abutment, the wall 112 being arranged between the side walls 108 and 110.

The reading/writing device has:
- a rectangular shape, seen from its front or rear face, and
- a tapered shape, seen from each of its side faces. The two side faces, formed by the protective walls 108 and 110, also have an identical tapered shape.

The side module 104 is of a general outer shape similar to the general outer shape of the reading/writing device 102 and of dimensions smaller than the dimensions of the device 102.

In the example shown in FIG. 1, the side module 104 and the reading/writing device 102 are bonded or assembled together so that the collection terminal is presented in the form of a single-piece assembly. The reading/writing device 102 constitutes a main body of the collection terminal 100 to which the side module 104 is fixed.

The different elements of the self-service collection terminal 100 are linked to a central unit capable of controlling each of the described devices or module using a computer program. Such a central unit is a standard computer comprising therefore in particular a microprocessor and a memory. The computer program is executed by means of the microprocessor and stored in the memory of the central unit. The central unit can also be in communication, via a network, with one or more external servers, storing for example a database relating to the products sold in the retail space.

Figure 2:
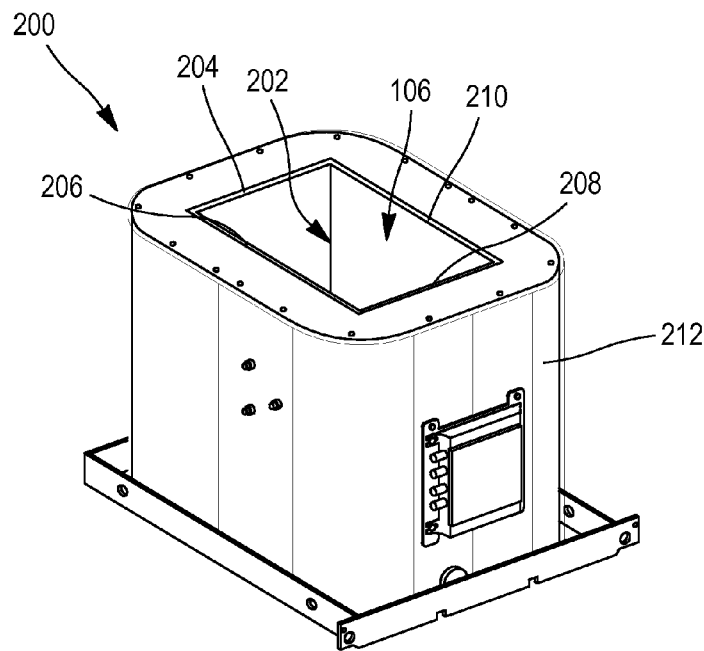
FIG. 2 is a diagrammatic representation of a non-limitative example of a reading/writing module comprising a depositing cavity, which can be utilized in a collection terminal according to the invention.

FIG. 2 is a diagrammatic representation of a non-limitative example of a reading/writing module comprising a depositing cavity, which can be utilized in a collection terminal according to the invention, in particular in the collection terminal 100 of FIG. 1.

The reading/writing module 200 shown in FIG. 2 is presented in the form of a drawer or of a rack which can be inserted/swiped in a housing provided for this purpose in the bottom part of a collection terminal, such as the collection terminal 100 of FIG. 1, and more particularly in the bottom part of a reading/writing device, such as the reading/writing device 102 of FIG. 1. In order to do this, the collection terminal, and in particular the reading/writing device, comprises a door/hatch giving access to such a housing, for example arranged in a protective front wall of the reading/writing device. The housing is delimited by the protective walls of the device.

The module 200 shown in FIG. 2 comprises a cavity 202 forming a space for depositing the objects to be purchased equipped with RFID tags intended to be read by the reading/writing device.

The reading/writing module 200 comprises, in its top part, an insertion aperture 106 allowing the objects to be placed in the depositing cavity 202.

The depositing cavity 202 is delimited by four vertical side walls 204-210. Each side wall 204-210 is made of metal and will be referred to below as the reading wall.

The reading/writing module 200 comprises an outer side wall 212 surrounding the side walls 204-210 and the depositing cavity 202. The outer wall 212 comprises no sharp edges in order to prevent radiation of the waves transmitted by the reading device.

Each reading wall 204-210 also comprises antennas (not visible). These antennas are connected to a reading means which makes it possible to read the data from the tags. The depositing cavity also preferably comprises a means for entering data into the tags. The RFID reading and writing means are well known to a person skilled in the art and will not described in greater detail here.

The reading/writing module 200 comprises an absorbent foam 214, arranged between the outer wall 212 and the reading walls 204-210 and provided in order to absorb the waves used for the reading/writing of RFID tags.

The reading/writing module 200 also comprises scales (not visible) the plate of which the forms the bottom wall of the depositing cavity 202.

Figure 3:
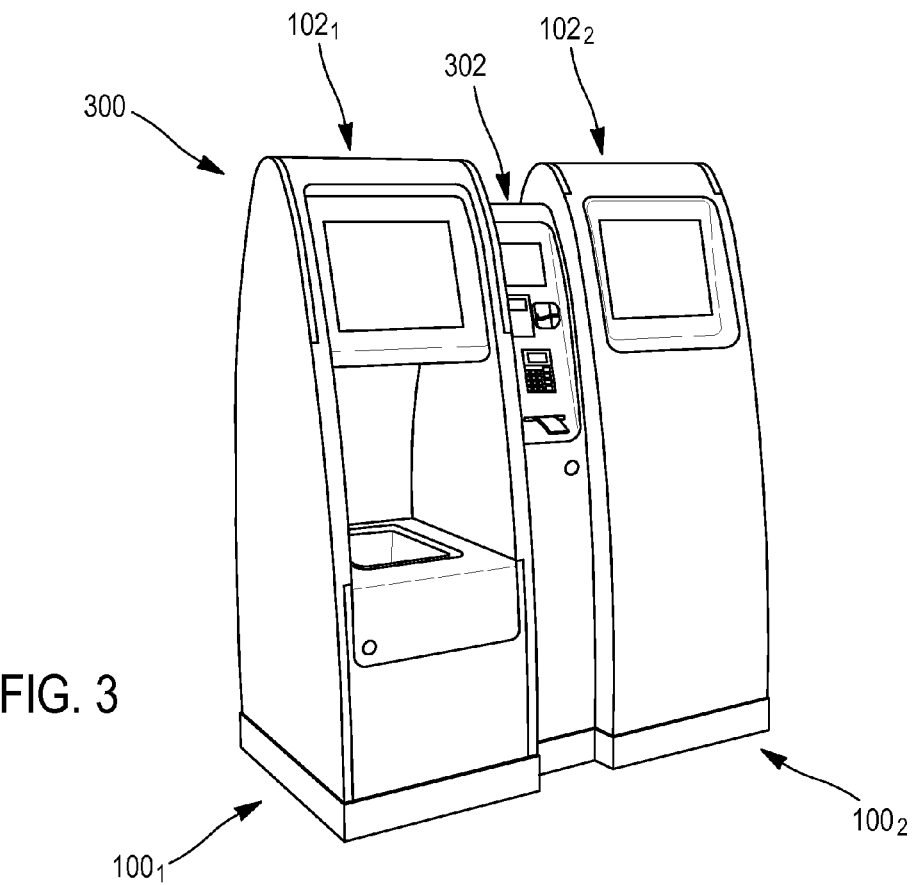
FIG. 3 is a diagrammatic representation of a non-limitative example of an assembly according to the invention comprising two collection terminals according to the invention.

FIG. 3 is a diagrammatic representation of a non-limitative example of an assembly according to the invention.

The assembly 300 shown in FIG. 3 comprises two collection terminals $100_1$ and $100_2$ each comprising a reading/writing device $102_1$ and $102_2$ as described with reference to FIG. 1.

The collection terminal $100_1$, and consequently the reading/writing device $102_1$ which constitutes the main body of the collection terminal $100_1$, is directed in a first direction, and the collection terminal $100_2$, and consequently the reading/writing device $102_2$ which constitutes the main body of the collection terminal $100_2$, is directed in a second direction opposite to the first direction. This means that the access openings (allowing access to each depositing cavity) of the two devices $102_1$ and $102_2$ are respectively situated on two different sides of the terminal.

The assembly 300 also comprises a side module 302, common to the two collection terminals $102_1$ and $102_2$, also known as a central module, arranged between said collection terminals, in particular between the reading devices $102_1$ and $102_2$ of the collection terminals $100_1$ and $100_2$. The central module 302 is also in contact with the reading devices $102_1$ and $102_2$ of the collection terminals $100_1$ and $100_2$.

The central module 302 comprises two payment assemblies, each payment assembly comprising two payment devices and a printing device as well as a keyboard and a screen, as described above.

Each payment assembly is associated with a collection terminal and is placed on a different side of the side module 302. On each side of the assembly 300 there is therefore an access to a collection terminal, i.e. to a reading/writing device and a payment assembly.

A description will now be given of an example of the method of collection according to the invention, which can be implemented by a collection terminal according to the invention, such as for example the collection terminal described with reference to FIG. 1.

A user introduces objects placed in a bag for collection of payment in the depositing cavity, via the access opening and the insertion aperture.

The reading/writing device, in particular via the weighing means, detects the presence of the objects in the depositing cavity and actuates the reading of the RFID tags affixed to each of the objects, namely the emission of a predetermined signal by the reading/writing means allowing the activation of the tags situated in the depositing cavity.

The information read is then displayed on a screen, for example the screen 118. Such information can comprise the price of the object the tag of which is read, the reference of the object and additional information (composition, calories, weight, brand, use-by date etc.). These data will have previously been entered into the RFID chip and/or into a database that can be consulted from the terminal and from which it is possible to extract the data stored in combination with an item of data read from the corresponding tag.

Other information can be displayed on the screen such as the total number of objects read, the total price, etc., calculated by a calculation module in the central unit.

The reading/writing device also weighs the objects by means of the scales situated at the base of the reading module and verifies that the weight of the objects read corresponds to the measured weight, in order to verify that no objects have been read by the device that were not placed in the deposit space.

When the measured weight corresponds to the theoretical weight, the collection terminal validates the reading. Otherwise, it can bring about an alarm signal action, for example blocking the proper execution of the program and calling a agent to verify and change the result.

The result of this step of verification of the weight can be accompanied by an activation of light signalling means, such as for example the signalling means 120-122: green if the verification proves correct, red if not.

The references of the objects the tags of which are read are registered in a database. Optionally, it is also possible for data to be entered into the tag at this stage.

Other verification steps can be carried out, such as for example a verification that the use-by date associated with an object is indeed later than a certain date.

A message is then displayed on the screen asking whether the user wishes to add other objects. Depending on the user's response, the reading/writing device can be re-started with the same procedure as explained previously or a payment step can be initiated.

A message for the attention of the user is displayed on the screen asking by what means he wishes to pay. Depending on his response, one or other of the payment devices is activated and then takes control of the payment operation: the messages to the user then being displayed on a screen situated on the side module of the terminal, such as for example the screen 132 in FIG. 1.

After payment, one or more tickets validating the operation can then be printed by a printing device, such as the printing device 128 in FIG. 1.

Once the payment operation has been carried out, the objects the references of which have been entered into the databases are deemed paid for: this will be useful in particular when the user passes through the shop's anti-theft gates since, at this step, the tags will be read again and if one of the objects is deemed unpaid, this will activate an alarm linked to the anti-theft gate.

Other steps can be added to this method. For example, in order to initiate the collection process, it may be necessary for the user to interact with the interaction device, for example by touching the screen. It is also possible to read a user's loyalty card.

Of course, the invention is not limited to the examples which have just been described. For example each terminal, or each reading/writing device can comprise a top wall meeting all of the side walls. Each terminal can also have a form other than that described. Each collection terminal may comprise no side (or central) module: in this case the payment device(s) can be arranged on/in the walls of the reading/writing device. The collection terminal can also comprise a single payment device, and the printing device is optional. The protective walls can also be replaced by a single protective wall having a radius of curvature. It is possible for the insertion aperture not to be situated in a horizontal plane and for the protective walls and the access opening not to be situated in a vertical plane or a plane perpendicular to that of the access opening.

Other payment means/devices can be used, such as automated payment/ticketing means allowing payment by notes, coins and luncheon vouchers.

The invention claimed is:

1. A device for reading/writing of at least one RFID tag carried by at least one object, the device comprising:
    at least one depositing cavity, for receiving said at least one object, said depositing cavity comprising:
    at least one bottom wall and at least one side wall;
    at least one RFID reading/writing means; and
    at least one insertion aperture for depositing objects in said depositing cavity, said at least one insertion aperture formed substantially in a top surface of said depositing cavity;
    at least one protective wall extending upwardly from said at least one side wall and including an access opening for accessing said at least one insertion aperture through said at least one protective wall, said at least one protective wall being made of a material that attenuates waves between said depositing cavity and the outside.

2. The device according to claim 1, wherein the access opening is situated in a plane substantially perpendicular to the plane of the insertion aperture.

3. The device according to claim 1, wherein the at least one insertion aperture is situated in a substantially horizontal plane, and the access opening is situated in a substantially vertical plane.

4. The device according to claim 1, wherein the depositing cavity is surrounded by an outer wall, encompassing said side walls of said depositing cavity, and comprising no sharp edges.

5. The device according to claim 1, wherein said at least one said side wall of said depositing cavity is metal.

6. The device according to claim 1, wherein said at least one protective wall further includes several abutting protective side walls, extending upwardly from said at least one insertion aperture, the access opening being arranged in one of said protective side walls.

7. The device according to claim 1, wherein said material of said at least one protective wall comprises an absorbent foam chosen in order to attenuate the waves transmitted by said at least one of RFID reading/writing means, and the RFID tag(s).

8. The device according to claim 1, wherein said at least one protective wall surmounts the at least one insertion aperture to a height greater than or equal to 0.5 m.

9. The device according to claim 1, further including at least one weighing means arranged in the base of the depositing cavity for measuring the weight of the objects deposited in said depositing cavity.

10. The device according to claim 1, further including at least one visual device or acoustic device for interaction with a user, situated at a distance from the at least one insertion aperture, in the upper part of the device.

11. A collection terminal comprising:
    a reading/writing device according to claim 1; and
    at least one payment device.

12. The terminal according to claim 11, wherein the payment device is arranged on a module contiguous with said reading/writing device, in contact with said at least one protective wall.

13. An assembly comprising: two collection terminals according to claim 11, the at least one payment means of each terminal being arranged on a central module, common to said terminals and in contact with a protective wall of the reading/writing device of each collection terminal.

14. The assembly according to claim 13, wherein the collection terminals are arranged so that the access opening and the payment means of one of said terminals are arranged on a first side of said assembly, and the access opening and the payment means of the other one of said terminals are arranged on a second side of said assembly, opposite said first side.

* * * * *